United States Patent [19]

Just

[11] 4,367,073

[45] Jan. 4, 1983

[54] PREPARATION OF SOLID, CRYSTALLINE, SUBSTANTIALLY ANHYDROUS SODIUM METASILICATE

[75] Inventor: Günther Just, Hilden, Fed. Rep. of Germany

[73] Assignee: Henkel Kommanditgesellschaft auf Aktien, Düsseldorf-Holthausen, Fed. Rep. of Germany

[21] Appl. No.: 319,916

[22] Filed: Nov. 10, 1981

[30] Foreign Application Priority Data

Jun. 25, 1981 [DE] Fed. Rep. of Germany ....... 3124893

[51] Int. Cl.³ .............................................. C01B 33/32
[52] U.S. Cl. .............................. 23/302 T; 23/313 AS; 423/332
[58] Field of Search ................. 23/300, 302 R, 302 T, 23/313 AS; 423/332, 333

[56] References Cited

U.S. PATENT DOCUMENTS

| | | | |
|---|---|---|---|
| 2,443,128 | 6/1948 | Beecher | 423/333 |
| 2,826,482 | 3/1958 | Laymon | 23/313 AS |
| 2,881,049 | 4/1959 | Erbe et al. | 423/332 |
| 3,471,253 | 10/1969 | Shaver | 23/313 AS |
| 3,529,979 | 9/1970 | Yarsa | 23/313 AS |
| 3,537,815 | 11/1970 | Burke, Jr. | 423/333 |
| 3,650,977 | 3/1972 | Bobb | 423/332 |
| 3,884,645 | 5/1975 | Kinne | 23/313 AS |

Primary Examiner—Gregory N. Clements
Attorney, Agent, or Firm—Hammond & Littell, Weissenberger and Muserlian

[57] ABSTRACT

This invention relates to the preparation of sodium metasilicate. More particularly, this invention relates to a process for the preparation of solid, crystalline, substantially anhydrous sodium metasilicate which comprises the steps of:

(a) reacting an $SiO_2$-containing material with a concentrated aqueous solution of sodium hydroxide in an $SiO_2$ to $Na_2O$ molar ratio of from about 1.2:1 to 1:1.2 under elevated pressure and at an elevated temperature, to form a sodium metasilicate suspension;
(b) filtering the suspension from step (a) to obtain a filter cake and filtrate;
(c) crushing the filter cake from step (b) at elevated temperature;
(d) removing water from the crushed filter cake to recover substantially anhydrous sodium metasilicate;
(e) concentrating the filtrate from step (b); and
(f) returning the concentrated filtrate from step (e) to the reaction mixture of step (a).

9 Claims, No Drawings

PREPARATION OF SOLID, CRYSTALLINE, SUBSTANTIALLY ANHYDROUS SODIUM METASILICATE

FIELD OF THE INVENTION

This invention relates to the preparation of sodium metasilicate. More particularly, this invention relates to the preparation of sodium metasilicate by reacting an $SiO_2$-containing material with concentrated sodium hydroxide to obtain a suspension, filtering the suspension at elevated temperature, and crushing the resulting filter cake at elevated temperature.

BACKGROUND OF THE INVENTION

It is generally known that anhydrous sodium metasilicate can be produced through fusion or sintering of soda with sand. The fusion or sintering product thus obtained has to subsequently be crushed, and so the final product unavoidably contains considerable amounts of dust. There are also substantial difficulties when one attempts to obtain a crystalline product through the evaporation of sodium metasilicate solutions. Here, the heat exchange surface will become coated, in a short period of time, with a hard layer of anhydrous sodium metasilicate, which coating then precludes any economical heat transfer. Because of the high temperatures that are required, there are also certain difficulties in obtaining anhydrous products by atomizing sodium metasilicate solutions. In addition, such spray-dried products contain substantial amounts of dust.

To avoid the above-mentioned disadvantages, it has been suggested in, for example, German published application No. 15 67 572, to produce anhydrous crystalline alkali metal silicate, preferably sodium metasilicate, by spraying an aqueous alkali metal silicate solution onto a finely distributed solid alkali metal silicate, which is heated to a temperature in excess of 130° C. and kept in constant motion, thus forming a film of said aqueous alkali metal silicate solution on the surface of said solid alkali metal silicate, and evaporating water by means of an additional hot gas stream, whereby the spraying and drying steps are repeated until the crystalline anhydrous alkali metal silica particles have grown to the desired size. Generally, a portion of the resulting largely anhydrous alkali metal silicate is returned to the continuous reaction as starting component.

According to German published application No. 21 00 544 anhydrous sodium metasilicate is produced by injecting, through jet nozzles, a from 40 to 60 percent by weight sodium metasilicate solution into a highly turbulent zone, where the sodium metasilicate grains can be maintained at a temperature of between 125° and 350° C. The turbulent zone is created by a rising hot air stream which has a speed of between 22.9 and 61.0 m/minute.

The disadvantages of these known procedures are that in the sodium metasilicate being in constant motion in the turbulent zone a large number of sodium metasilicate grains is required for seeding and so a large portion of the already obtained spray granules have to be crushed again and returned to the turbulent zone, so that the overall yield of this procedure is being reduced.

From German Pat. No. 968,034, it is also known how to produce solid, water of crystallization-containing, sodium metasilicate by homogeneously mixing finely distributed silicic acid, such as quartz sand or quartz meal, with aqueous sodium hydroxide, at a ratio which corresponds approximately to the alkali metal oxide to $SiO_2$ ratio of the product to be made, adding this mixture continuously into a tubular reactor, against the pressure inside the reactor, and passing it through the tubular reactor in such a way at temperatures maximally about 175° C., so that an even distribution of the silicic acid within this mixture is being assured by regulation of the linear throughput speed. Subsequently, the hot reaction product is taken out of the tublar reactor through a reduction valve, whereby the originally higher water content of the reaction product formed is lowered through water evaporation to the desired water content of the end product. This way it is possible to produce sodium metasilicate hydrate with less than 9 mols of water of crystallization.

It is further known from European patent application No. 0 001 368 to produce a metasilicate containing from 2 to 6 percent by weight of water by injecting an aqueous metasilicate solution into a pulverized, stirred mass of an anhydrous metasilicate, whereby the mixing zone is heated with hot gases to the extent that the granulate thus formed is given sufficient consistency and it also retains from 1 to 8 percent by weight of water in the granulate. Subsequently the granulate obtained is exposed to a heat treatment in a stirred container to accomplish an at least partial conversion into metasilicate penta-hydrate.

Furthermore, Netherlands paatent application No. 78 02 697 discloses the production of sodium silicate solutions by passing sand together with sodium hydroxide, under elevated pressure and at a temperature of at least 200° C., through a tubular reactor such as one used for the continuous decomposition of bauxite. Such a reactor is known, for example, from German published application (DE-OS) No. 21 06 198 as well as from German published application (DE-OS) No. 25 14 339. During the production of metasilicates one preferably works at a temperature of from 200° to 240° C.; for products with a higher ratio of $SiO_2:Na_2O$ one preferably uses a temperature range of from 240° to 280° C. The pressure inside the reactor is preferably in the range of from 100 to 200 bar. However, according to the procedure described, only solutions and not solid products are obtained.

OBJECTS OF THE INVENTION

It is object of the invention to provide a process for the preparation of sodium metasilicate which avoids the disadvantages of prior art procedures.

It is also an object of the invention to provide substantially anhydrous sodium metasilicate in a well-defined crystalline form.

It is a further object of the invention to provide a process for the preparation of solid, crystalline, substantially anhydrous sodium metasilicate which comprises the steps of:

(a) reacting an $SiO_2$-containing material, such as quartz sand and/or quartz meal, with a concentrated aqueous solution of sodium hydroxide in an $SiO_2$ to $NA_2O$ molar ratio of from about 1.2:1 to 1:1.2 under elevated pressure and at an elevated temperature, to form a sodium metasilicate suspension;

(b) filtering the suspension from step (a) to obtain a filter cake and filtrate;

(c) crushing the filter cake from step (b) at elevated temperature;

(d) removing water from the crushed filter cake to recover substantially anhydrous sodium metasilicate;
(e) concentrating the filtrate from step (b); and
(f) returning the concentrated filtrate from step (e) to the reaction mixture of step (a).

These and other objects of the invention will become more apparent from the discussion below.

DETAILED DESCRIPTION OF THE INVENTION

It has now been found that substantially anhydrous sodium metasilicate in a well-defined crystalline form can be produced. According to Applicant's invention, solid, crystalline, substantially anhydrous sodium metasilicate is prepared by the steps of:

(a) reacting an $SiO_2$-containing material, such as quartz sand and/or quartz meal, with a concentrated aqueous solution of sodium hydroxide in an $SiO_2$ to $NA_2O$ molar ratio of from about 1.2:1 to 1:1.2 under elevated pressure and at an elevated temperature, to form a sodium metasilicate suspension;
(b) filtering the suspension from step (a) to obtain a filter cake and filtrate;
(c) crushing the filter cake from cake from step (b) at elevated temperature;
(d) removing water from the crushed filter cake to recover substantially anhydrous sodium metasilicate;
(e) concentrating the filtrate from step (b); and
(f) returning the concentrated filtrate of step (e) to the reaction mixture of step (a).

It has been surprisingly found, whereas in the past solid sodium metasilicate could be obtained from the concentrated filtrate, or mother liquor, only with great technological effort since the sodium metasilicate dissolved therein tended not to crystallize, the above process makes it possible to extract the sodium metasilicate from the mother liquor in crystalline form and to provide good crystal formation.

The return of the concentrated filtrate from step (e) to the decomposition reaction mixture of step (a) can be accomplished in various ways. For instance, the concentrated filtrate can be introduced to the reaction mixture as such or it can be mixed with one or more of the reaction components before decopmosition and then be introduced to the decomposition reaction, or the concentrated filtrate can be mixed only with the suspension obtained from the decomposition reaction. Furthermore, the concentrated filtrate can be separated into two or more portions, and these different portions can then be returned at one or more places to the decomposition reaction, or if desired, only part of the concentrated filtrate can be reintroduced into the cycle.

Within the spirit of this invention it is preferable that the concentrated filtrate or mother liquor is recycled either alone or together with the reaction components to the decomposition reactor. According to another preferred aspect of the invention, the concentrated filtrate is mixed with the suspension obtained from the reaction.

Return of the concentrated filtrate to the decomposition reactor, as well as return to the suspension, causes crystallization of the sodium metasilicate contained therein. It has been shown that such crystallization is temperature and time dependent. In a, for practical purposes, still suitable time interval, comparatively little crystallizate forms from the concentrate filtrate below 80° C.; at from 120° to 130° C., during which the concentrated filtrate boils under atmospheric pressure, about 10% precipitates as crystallizate; and, at 150° C. and above a very good yield of crystallized material is obtained. Therefore, it is preferable within the scope of this invention to mix the concentrated filtrate with the decomposition components or with the decomposition suspension, respectively, at temperatures above 150° C. and under the corresponding pressure required to keep the total mixture liquified.

Even at low temperatures the yield of crystallizate can be improved, if longer reaction times are acceptable. However, such prolonged reaction times for large-scale applications of the procedure according to the invention, are generally less suitable and therefore, as a rule, undesirable.

For specific cases it can easily be determined, through appropriate pre-trails, under what conditions the procedures according to the invention and within the scope discussed above can most effectively be executed or the crystal growth of the sodium metasilicate can be optimized.

It should also be mentioned that within the scope of the invention the terminology "substantially anhydrous sodium metasilicate" represents sodium metasilicate which generally contains not more than 5 percent by weight of water on the average, preferably only 3 percent by weight or less.

The procedures according to the invention can be executed discontinuously, i.e., batchwise, as well as continuously.

Suitable $SiO_2$-containing materials for the procedure according to the invention include quartz sand and/or quartz meal of suitable particle size. Generally, this particle size is from about 0.1 to 0.8 mm. In a discontinuous execution of the procedure, with relatively long heating up, reaction, and cooling off times, one could use, for instance, a quartz sand having a particle size range of from 0.4 to 0.8 mm for about 23 percent by weight, 0.2 to 0.4 mm for about 73 percent by weight, and from 0.1 to 0.2 mm for about 4 percent by weight. For continuous work it is advisable to use smaller particles of quartz sand or quartz meal, preferably not in excess of 0.3 mm.

The caustic soda used for decomposition generally has a concentration of from about 40 to 60 percent by weight, preferably about 50 percent by weight, of sodium hydroxide.

The decomposition treatment is generally done at temperatures in the range of from about 200° to 400° C., preferably from about 240° to 300° C. The required pressure can be obtained during the decomposition treatment, for example, by using a pressure vessel or—in a continuous execution of the procedure—by using a pressure tube reactor, whereby associated pumps and valves build up and maintain the desired pressure. An arrangement suitable for use in the invention herein is described in German published application (DE-OS) No. 21 06 198 for the continuous disintegration of bauxite.

During discontinuous execution of the procedure of the invention, the concentrated filtrate is generally mixed with the suspension obtained from the reaction in step (a). It is thus preferable to maintain a temperature above 150° C. Usually this temperature can be reached by mixing the concentrated filtrate with the suspension still in the decomposition reactor.

The suspension obtained by addition of the concentrated filtrate or mother liquor either to the decomposition reactor or to the decomposition suspension, is subsequently cooled down to a temperature range of from about 70° to 130° C., preferably to from about 90° to 105° C., and the cooled suspension then contains from about 40 to 50 percent of the total amount of silicate in the form of finely crystallized precipitate. This precipitate can be easily filtered out to form an interwoven, continuous layer which has a water content of from about 5 to 20 percent by weight, calculated as $H_2O$, based upon the total weight fo the filter cake.

Such filtration is preferably done as pressure filtration at the indicated temperature range of from about 70° to 130° C., especially at from about 90° to 105° C. However, other filtration methods are also suitable for the execution of the procedure according to the invention.

At temperature range of from about 70° to 90° C. the filter cake is soft and pliable, and it can then be shaped —for example, in an extruder—into a granulate of desired diameter, for example, about 1 mm, and with only a small amount of agglomerate or fine dust formation it can be dried in a turbulent bed dryer or in a moving contact dryer, to obtain a water content less than 3 percent by weight. The coarse portion of the dried product can, if desired, be crushed and then returned again to the remainder of the dried product, and after that the entire volume of the end product can then be passed through a sieve, if needed.

It is preferable that the filter cake be crushed or granulated at a temperature range from about 70° to 90° C.

The filtrate obtained after filtration in step (b) can be evaporated to a concentration corresponding to that of the original reaction condition in a cost-effective and energy-saving way in, for example, a multiple-step evaporator. The filtrate liquor thus obtained is in the form of a viscous solution, from which practically no further solids will precipitate at these high temperatures. This concentrated filtrate or mother liquor can then, as discussed above, be returned to the cycle.

The sodium metasilicate obtained by means of the procedure according to the invention comprises, according to x-ray diffraction and electron micrographs, highly crystalline products, which contain crystallites with a medium length of from about 5 to 10 μm and a median diameter of from about 1 to 3μm. The water content of the sodium metasilicate is generally, on average below 5 percent by weight.

The following examples are intended to illustrate the invention and are not to be construed as limiting it thereto.

EXAMPLES

Example 1—Discontinuous Procedure

Four hundred eighty-nine kilograms of quartz sand having the following size specturm:

| Particle Size | Percent by Weight |
|---|---|
| 0.4 to 0.8 mm | 23 |
| 0.2 to 0.4 mm | 73 |
| 0.1 to 0.2 mm | 4 | were added to a 50 percent by weight aqueous sodium hydroxide solution, the $SiO_2:Na_2O$ molar ratio being about 1:1, and these coomponents were reacted in a rotating pressure vessel at 250° C. for one hour. After the one hour reaction time, 2204 kg of concentrated filtrate from an earlier reaction having a temperature of 100° C., were added to the reaction product under pressure (30 to 40 bar). The resulting suspension was then cooled to about 100° C. and filtered through a pressure filter. The result was 2820 kg of filtrate and 1180 kg of filter cake. The filter cake was formed into a 1 mm granulate in an extruder at about 80° C., and the granulate was subsequently dried in a turbulent bed dryer, whereby 180 kg of water were evaporated. The product obtained was then passed through a sieve; this provided 1000 kg of crystalline sodium metasilicate with a water content below 1 percent by weight.

The filtrate obtained from the filtration process was concentrated in a multiple-step evaporator chamber, to provide 616 kg of evaporated water and 2204 kg of concentrated filtrate. The concentrated filtrate, which contained 1198.5 kg of sodium metasilicate, was subsequently added to a new reaction suspension.

Example 2—Continuous Procedure

A mixture of quartz sand having particles below 0.3 mm and a 50 percent by weight aqueous solution of sodium hydroxide, in an $SiO_2:Na_2O$ molar ratio of 1:1, and recycled concentrated filtrate, which mixture was stirred in a reaction vessel equipped with a stirrer, was transferred into a tubular reactor maintained at a pressure of 60 to 70 bar by a piston-membrane pump. The mixture was heated to about 270° to 280° C., largely by heat exchange with reaction products to be cooled, maintained at that temperature for from 10 to 15 minutes, and subsequently cooled and depressurized. Filtration of the suspension thus obtained as well as further treatment of the filter cake and filtrate were in accordance with the procedures described in Example 1.

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. A process for the preparation of solid, crystalline, substantially anhydrous sodium metasilicate which comprises the steps of:
   (a) reacting an $SiO_2$-containing material with a concentrated aqueous solution of sodium hydroxide in an $SiO_2$ to $Na_2O$ molar ratio of from about 1.2:1 to 1:1.2 under elevated pressure and at an elevated temperature, to form a sodium metasilicate suspension;
   (b) filtering the suspension from step (a) to obtain a filter cake and filtrate;
   (c) crushing the filter cake from step (b) at elevated temperature;
   (d) removing water from the crushed filter cake to recover substantially anhydrous sodium metasilicate;
   (e) concentrating the filtrate from step (b); and
   (f) returning the concentrated filtrate from step (e) to the reaction mixture of step (a).

2. the process of claim 1, wherein the $SiO_2$-containing material is quartz sand and/or quartz meal.

3. The process of claims 1 or 2, wherein the concentrated filtrate from step (e) is added to the reaction mixture in step (a) either as such or in admixture with the reactants.

4. The process of claims 1 or 2, wherein the concentrated filtrate from step (e) is added to the suspension formed in step (a).

5. The process of claims 1 or 2, wherein the reaction of step (a) takes place at a temperature of from 200° to 400° C. under sufficient pressure whereby said reactants are primarily in the liquid phase.

6. The process of claim 5, wherein the reaction of step (a) takes place at a temperature of from 240° to 300° C.

7. The process of claims 1 or 2, wherein in step (b) the suspension is filtered at a temperature of from about 70° to 130° C.

8. The process of claim 7, wherein in step (b) the suspension is filtered at a temperature of from about 90° to 105° C.

9. The process of claims 1 or 2, wherein in step (c) the filter cake is crushed at a temperature of from 70° to 90° C.

* * * * *